United States Patent [19]

Frank

[11] 4,234,374
[45] Nov. 18, 1980

[54] BI-DIRECTIONAL STEP-OVER TAPE APPLICATOR HEAD

[75] Inventor: Ed Frank, Glenolden, Pa.
[73] Assignee: The Boeing Company, Seattle, Wash.
[21] Appl. No.: 949,476
[22] Filed: Oct. 10, 1978
[51] Int. Cl.³ .............................. B31F 1/00; B44C 7/00
[52] U.S. Cl. .................................... 156/459; 156/574
[58] Field of Search ................ 156/459, 574, 577, 474

[56] References Cited

U.S. PATENT DOCUMENTS

| | | | |
|---|---|---|---|
| 3,010,508 | 11/1961 | Wilson | 156/459 |
| 3,740,282 | 6/1973 | Watson | 156/183 |
| 4,043,855 | 8/1977 | Patin | 156/204 |

*Primary Examiner*—Douglas J. Drummond
*Attorney, Agent, or Firm*—Felix J. D'Ambrosio; Edwin E. Greigg; Jack D. Puffer

[57] ABSTRACT

The invention relates to a tape applicator head for dispensing tape onto a working surface in the construction of primarily structural parts. The tape applicator head includes a slidably mounted cylinder to which a rotation rack assembly is mounted. The rotation rack assembly includes a pair of dispensing and compacting blocks which are mounted to be stationary relative to each other but to pivot in unison relative to the remainder of the head at the end of a tape laying pass. This pivotal movement of the dispensing and compacting blocks produces the unique step-over or the looping of the tape.

12 Claims, 15 Drawing Figures

FIG. 7d
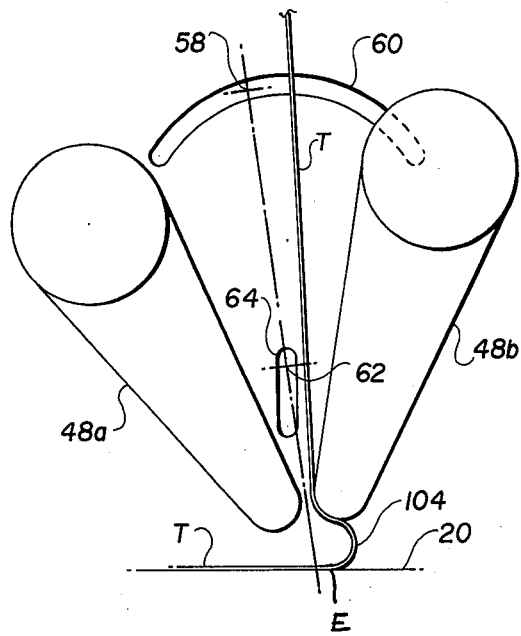
FIG. 7e
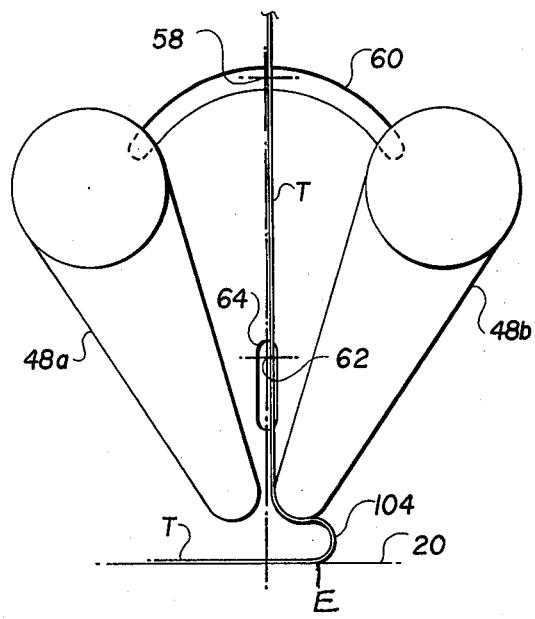
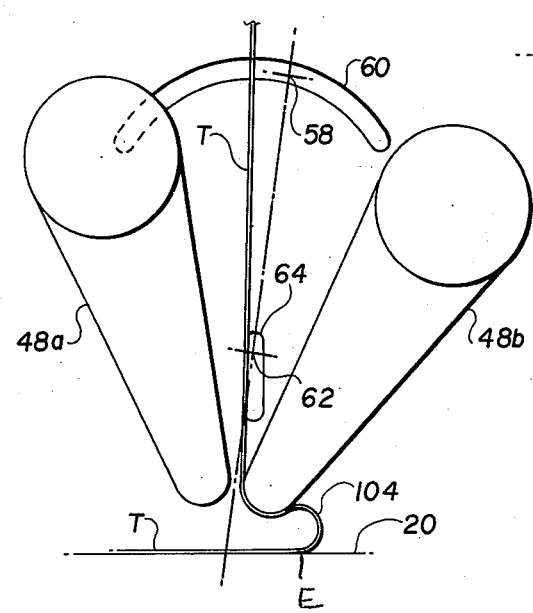
FIG. 7f

BI-DIRECTIONAL STEP-OVER TAPE APPLICATOR HEAD

CROSS-REFERENCE TO RELATED APPLICATION

This application discloses subject matter disclosed in co-pending application, Ser. No. 949,477, filed on even date herewith in the name of Robert H. Ballentine. Both applications are assigned to a common assignee. Both applications share the following features:

1. They both dispense tape from a tape applicator head onto a working surface and compact the tape on the working surface.
2. They are both bi-directional, i.e., they both dispense tape from a tape applicator head into opposing direction while maintaining the orientation of the head unchanged.

BACKGROUND OF THE INVENTION (a) Field of the Invention

The field of the invention encompasses tape dispensing and application.

The invention was developed primarily for use in the field of composite technology. In particular, the invention is used in constructing, for example, helicopter rotor blades, rotor blade parts, and other structural and aerodynamic parts of a helicopter. The invention can also be used, however, for the construction of structural and aerodynamic parts of aircraft other than helicopters, for the construction of missiles, satellites, automobile bodies, rail cars, ships and the like.

According to composite technology, a resin preinpregnated tape having, for example, fiberglass filaments is utilized with or without an additional resin adhesive to construct the particular part desired. The final part is built-up of a successive application of layers of the tape to, for example, a mandrel. The resulting part is light in weight and highly load redundant, so that it is more desirable than a corresponding part made from the traditional materials, such as steel, etc.

(b) Prior Art

In the early days of the development of composite technology the principle means for producing a so-called lay-up, i.e., a shaped but non-structuralized part which has been shaped using a given quantity of tape in one or more layers upon, preferably a mandrel, was by hand. Naturally the procedure was time consuming, and consequently expensive. In the helicopter art, and in particular the rotor blade art, manual procedures are still used to some degree. However, machinery has been developed for replacing to a large extent the known manual procedures. One such machine in the form of a composite tape placement head is disclosed in U.S. Pat. No. 3,775,219. This particular machine does not have a loop-forming capability. In addition, the head T of this machine must be rotated at the end of each tape laying pass. It is not, therefore, bi-directional. Also, the tape is drawn from a supply spool by a drive roller. It is not drawn by movement of the applicator head.

OBJECTS OF THE INVENTION

It is an object of the invention to provide the state-of-the-art with a tape applicator head that is smaller in size and therefore less costly yet versatile in application.

It is another object of the invention to provide the state-of-the-art with a tape applicator head on which the man-hours per lay-up are reduced, thereby reducing operating costs.

It is another object of the invention to provide the state-of-the-art with a tape applicator head which is bidirectional, i.e., a tape applicator head which can dispense and apply tape in two opposed directions.

It is another object of the invention to provide the existing state-of-the-art with a tape applicator head which eliminates tape laying distortion, and in particular with a unique rotation rack assembly which produces a step-over or loop in the tape at the end of each tape laying pass to thereby insure that tape distortion is eliminated.

It is a related object of the invention to provide associated structure for the rack assembly for controlling the operation of the rack assembly in producing the step-over or loop in the tape during dispensing.

SUMMARY OF THE INVENTION

The development of the invention proceeded in response to a need to better lay composite tape so that tape distortion could be eliminated, in particular, at the terminal ends of a tape laying pass. By distortion I mean wrinkles or folds or even tears which can very frequently be introduced into the thin gauged flexible tape at the critical regions of the tape. I have found that one way to insure distortion elimination is to produce the step-over or loop in the tape at each terminal end.

The invention exhibits, therefore, at least two points of novelty. These are as follows:

1. a tape applicator head which includes a unique structural arrangement for dispensing tape such that the tape is formed into a loop at each terminal end of a tape laying pass.
2. an associated control arrangement for controlling tension in the tape and shifting of the rotation rack assembly.

The above noted objects are attained by a tape applicator head which includes the noted points of novelty and is embodied in a preferred form as shown in the drawings and described in detail below. The essential components of the tape applicator head include a mounting structure at one end of which a rotation rack assembly is mounted. The rotation rack assembly includes a pair of dispensing and compacting blocks which are pivotably shifted in unison at each terminal end of a tape laying pass and form the step-over or loop in that tape.

The mounting structure may include a slidably mounted guide tube at one end of which the rotation rack assembly is mounted. At the opposite end of the guide tube there is provided a clamp assembly and an actuator which together form part of the associated control arrangement noted above. Also included as part of the control arrangement are an actuator for controlling the sliding movement of the guide tube and an actuator for controlling the shifting of the dispensing and compacting blocks of the rotation rack assembly. Preferably, the three actuators are embodied as pneumatic actuators.

The step-over or loop serves to locally relieve the tension in the tape at each terminal end of the tape laying pass. Relieving the tension in the tape in these local areas insures a smooth reversal of the dispensing process. i.e., insures that folds, wrinkles and tears are avoided. Of course, the loop in the tape is eventually collapsed and a crease formed in the process of compaction. However, this crease or fold is not detrimental to

BRIEF DESCRIPTION OF THE DRAWINGS

FIGS. 7a–7i are functional diagrams illustrating shifting of the dispensing and compacting blocks in the rotation rack assembly for producing the step-over or looping of the tape.

DETAILED DESCRIPTION OF THE PREFERRED EMBODIMENT

Figure 1:
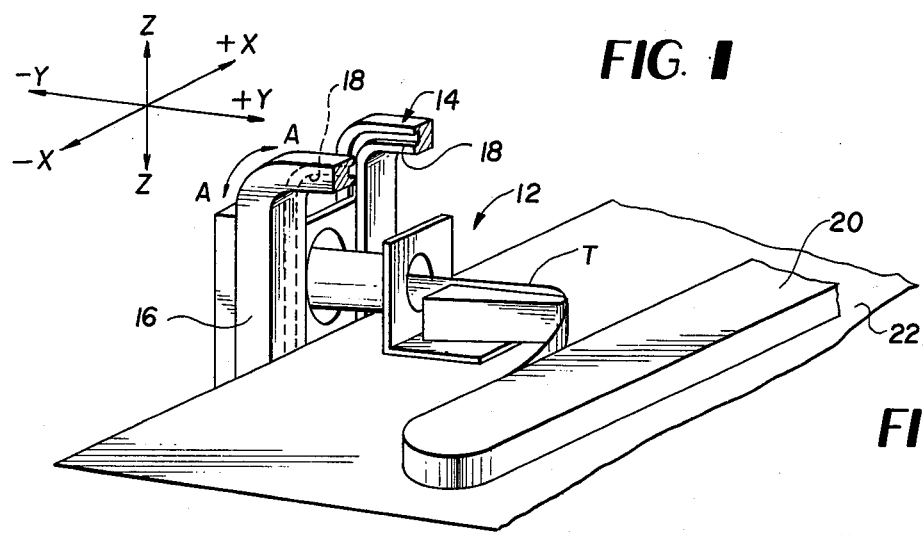
FIG. 1 is a perspective view illustrating, only schematically, a tape laying facility.
Figure 4:
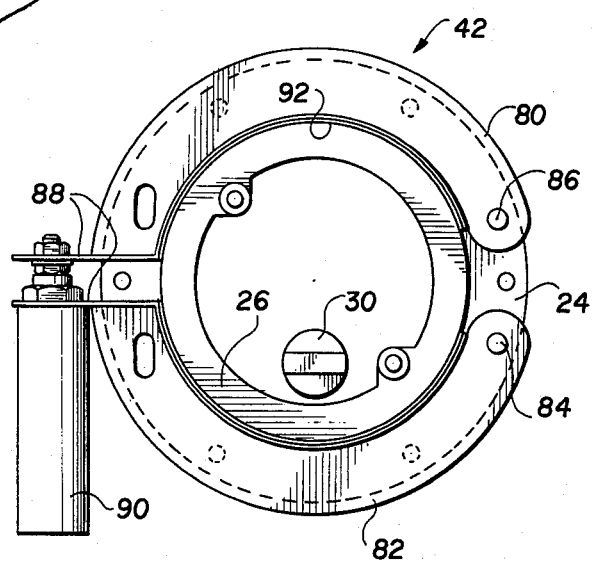
FIG. 4 is a plan view of the slide tube clamp assembly.

The tape lay-up facility 10 of FIG. 1, although only schematic, is typical of one type of tape lay-up facility being operated by applicant's assignee, which employs the tape applicator head of the invention.

The tape lay-up facility 10 includes the tape applicator head assembly 12 mounted to a partial gantry 14. The gantry 14 includes adjacent posts 16 between which the tape applicator head assembly 12 is mounted for displacement along parallel tracts 18 in the direction A. The drive for effecting displacement of the applicator head assembly 12 relative to the gantry 14 is not shown, nor is the drive for effecting displacement of the gantry 14 in the directions (X—X) and (Y—Y) since these drives do not form part of the invention.

As an alternative, it is also possible to move the work surface relative to the applicator head. Again, the drive for effecting this movement is not shown since it does not form a part of the invention.

Completing the tape lay-up facility 10 is a work surface in the form of a tape mandrel 20 fastened to a mandrel stand 22. The tape applicator head assembly 12 is shown in a horizontal orientation applying tape T to the mandrel 20. Although oriented horizontally, the tape applicator head 12 can be oriented at any angle between the extreme horizontal (Y—Y) and the extreme vertical (Z—Z) positions. The exact position depends on the surface contour of the mandrel 20, which in turn varies in accordance with the structure to be fabricated. The elongated rectangular mandrel 20 shown is used to lay-up the spar of the helicopter rotor blade.

The portion of the tape lay-up facility 10 which embodies the present invention is the tape applicator head assembly 12 shown in greater detail in FIGS. 2–6.

The tape applicator head assembly 12 includes a mounting cylinder 24 which forms part of the carriage, not otherwise shown, which includes means engageable with the tracts 18. Mounted slidably within the cylinder 24 is a guide tube 26. The guide tube 26 is biased in the direction of the mandrel 20 by an actuator 28. The actuator 28 has a housing 30 mounted to the cylinder 24 in a manner not shown. Extending from the housing 30 is a reciprocating rod 32 which is threadedly engaged within a socket 34 within a socket plate 36. The socket plate 36 also includes an annular groove 38 which receives the guide tube 26 and retains it in assembly by conventional means, such as welding. A rotation rack assembly 40 is mounted to the socket plate 36. Preferably, the rotation rack assembly 40 is bolted to the socket plate 36. At the opposite end of the guide tube 26 there is provided a clamp assembly 42.

Figure 6:
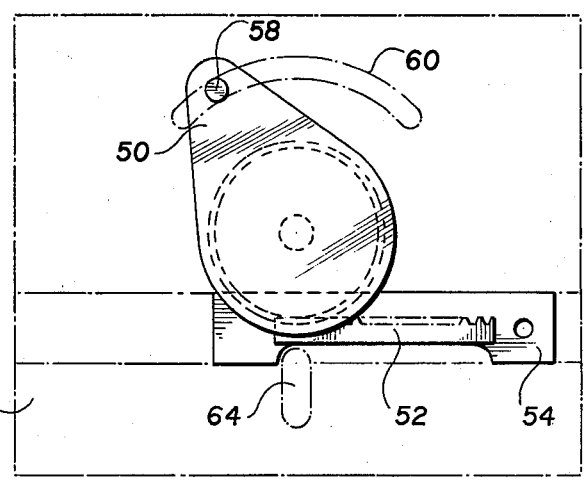
FIG. 6 is a plan view of the rotation rack assembly exclusive of the dispensing and compacting blocks and their mounting plate.

The rotation rack assembly 40 includes a mounting plate 44, a swivel plate 46, on which a pair of dispensing and compacting blocks 48a and 48b are rigidly mounted, and a transmission including a gear 50 and a rack 52. The rack 52 is embodied as an extension of a reciprocating rod 54 of an actuator 56. The rod 54 is slidable within a slot 56 formed in the mounting plate 44 (FIG. 6).

Figure 2:
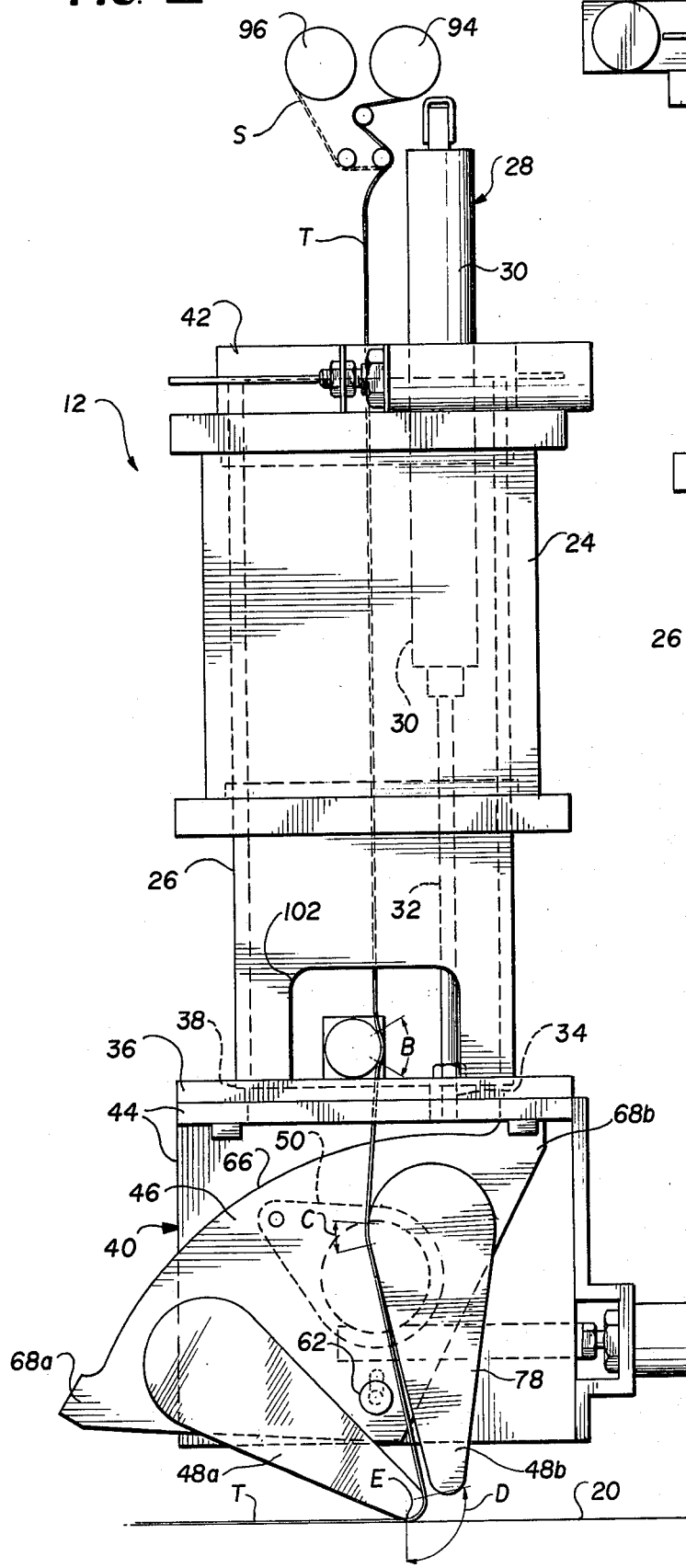
FIG. 2 is a front elavation view of the tape applicator head, illustrating the essential components of the head.

The gear 50 is mounted to the swivel plate 46 and includes a pin 58. The pin 58 is received in and travels along an arcuate slot 60, formed in the mounting plate 44. The swivel plate 46 also includes a pin 62 which is received in and travels along a slot 64, formed in the mounting plate 44. The swivel plate 46 has an arcuate surface 66 with tabs 68a and 68b at each end. The tabs engage slots (not shown) formed in the vertical portion of the mounting plate 44 (FIG. 2). The tabs 68(a and 68b serve two purposes: they serve as a stop during shifting of the swivel plate 46 at each terminal end of a tape laying pass; and they serve to lend stability to the swivel plate, and hence the dispensing and compacting blocks 48a and 48b during dispensing and compacting of the tape T.

Figure 5:
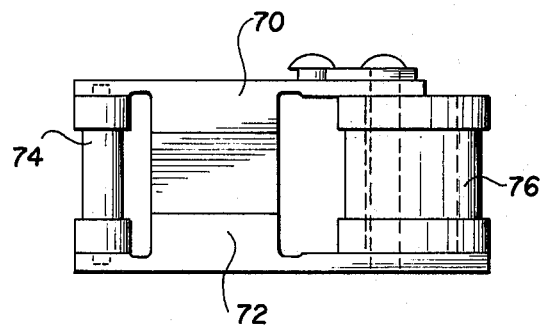
FIG. 5 is a side view of a dispensing and compacting block exclusive of the block belt.

The dispensing and compacting blocks 48a and 48b are constructed as shown in FIG. 5. Each block includes side plates 70 and 72 between which rollers 74 and 76 are mounted. A belt 78 (FIG. 2) extends about the two rollers 74 and 76.

The clamp assembly 42 includes arms 80 and 82 each pinned to the mounting cylinder 24 by pins 84 and 86. At their opposite end each arm includes an extension which together form a clevis 88. The clevis 88 has one end of a reciprocating rod of an actuator 90 fastened thereto. The actuator 90 provides the necessary operating force for clamping the arms 80 and 82 about the guide tube 26. Each of the arms 80 and 82 have a rubber liner 92 which actually engages the guide tube 26.

Figure 3:
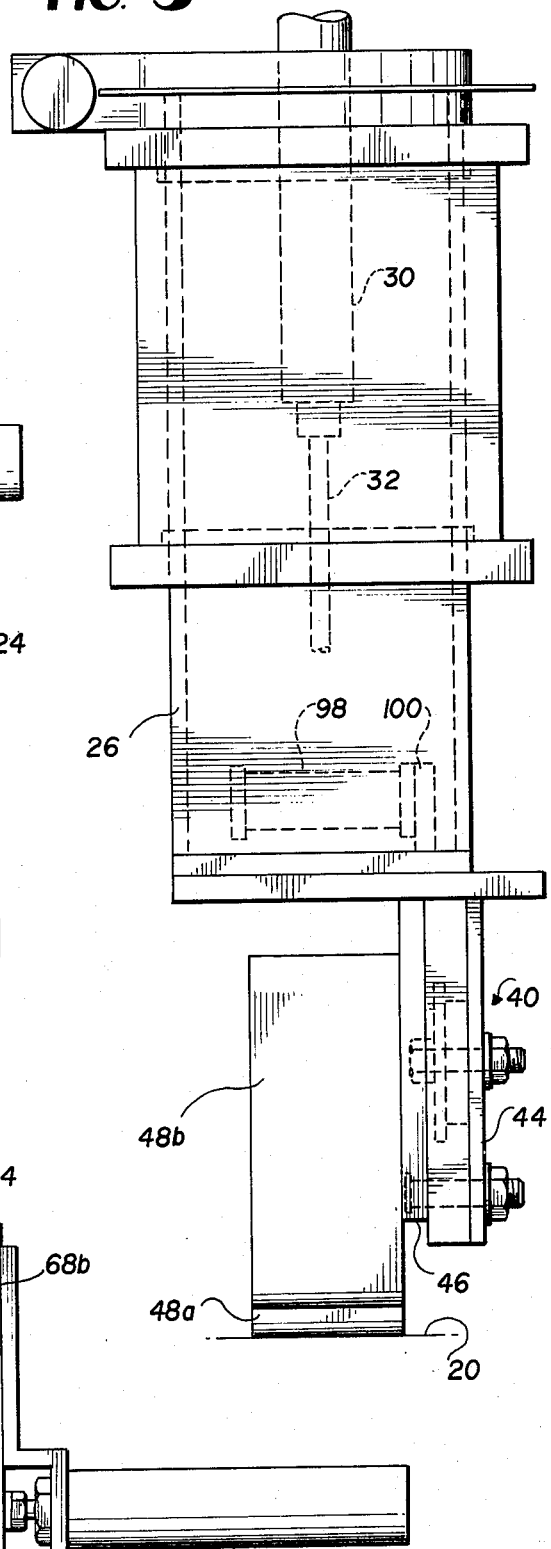
FIG. 3 is a side elavation view of the tape applicator head shown in FIG. 2.
Figure 7A:
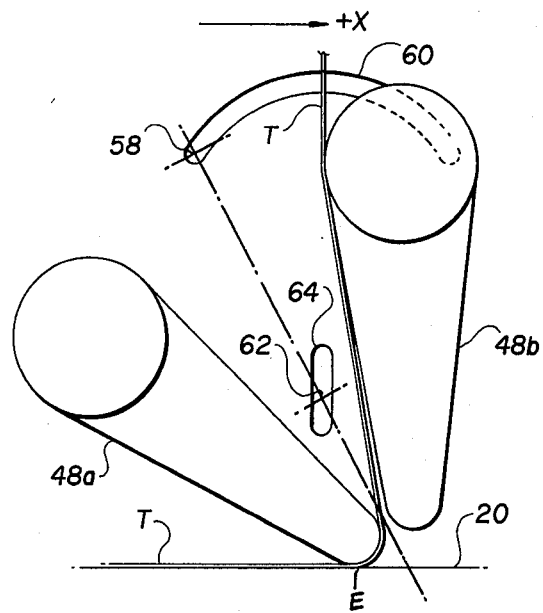
Figure 7B:
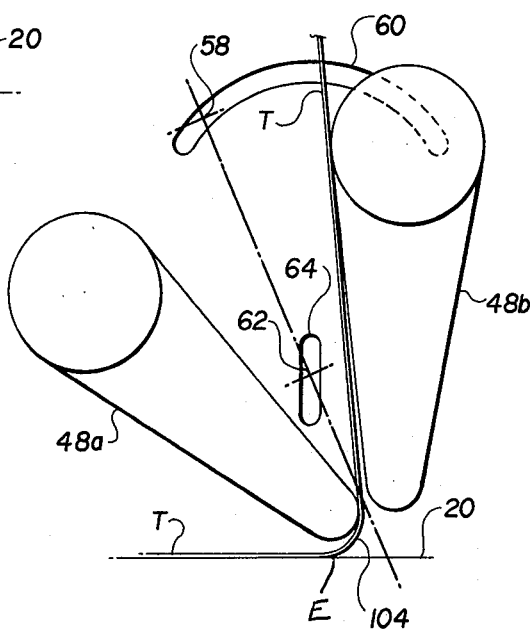
Figure 7C:
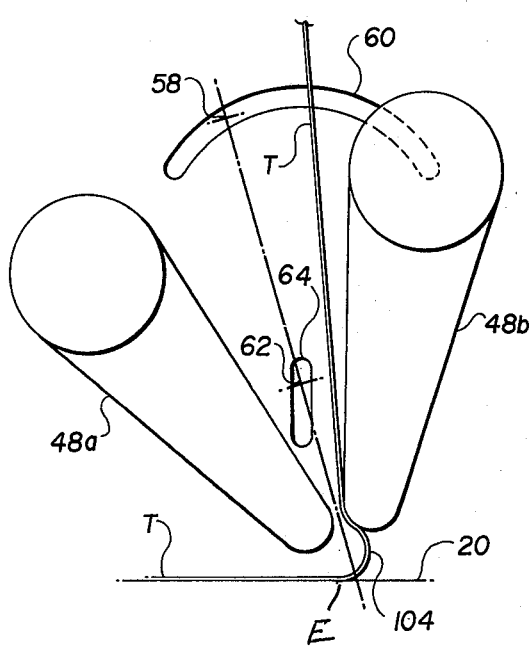
Figure 7G:
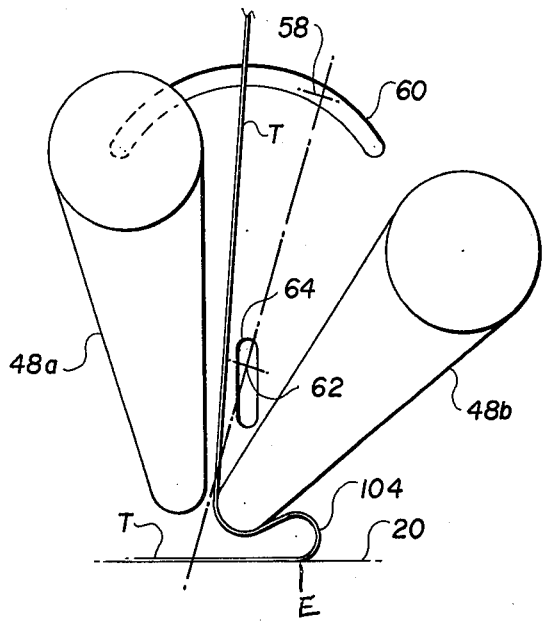
Figure 7H:
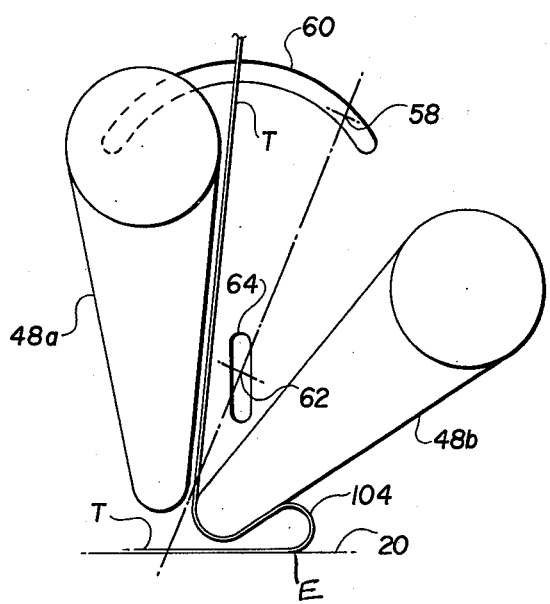
Figure 7I:
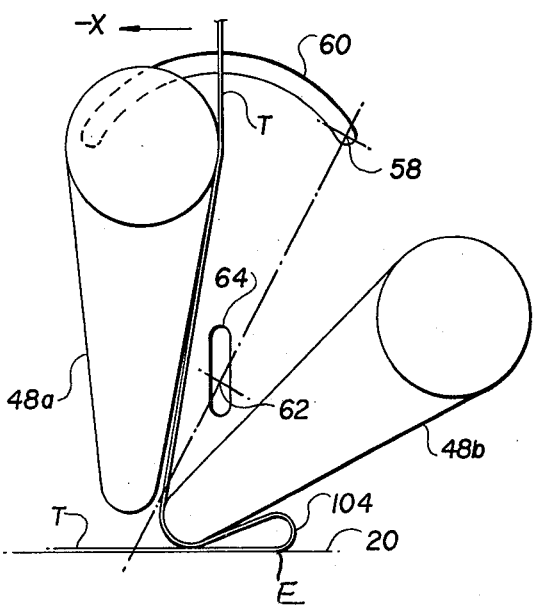

In dispensing tape utilizing the applicator head assembly 12, a supply spool 94 and a backing strip S take-up spool 96 are mounted to the carriage in a manner not shown. Both spools are shown schematically in FIG. 2. The backing strip S is removed from the tape T before the tape enters the guide tube 26. The tape T proceeds through the guide tube 26 to the rotation rack assembly 40. Just prior to leaving the guide tube 26, the tape T passes along a roller 98, which is mounted to a tab 100 of the socket plate 36 (FIG. 3). The tape engagement regions B and C serve to stabilize the tape T along that critical portion from the guide tube 26 to the surface of the mandrel 20. The tape engagement region B is effective for both positions of the dispensing and compacting blocks, although in the position where block 48b is active (not shown) the engagement force in region B is less than when block 48a is active (FIG. 2).

The guide tube 26 has an access slot 102 for access to the socket 34 and the roller 98.

In operation the backing strip S is separated from the tape T and threaded to the spool 96. The tape T is then passed through the guide tube 26 and between the dispensing and compacting blocks 48a and 48b. A sufficient length of tape is withdrawn so that the tape extends beyond the dispensing and compacting blocks for initiation of a laying pass. Assuming that the applicator head 12 is properly positioned along the X—X and Y—Y axis (gantry control), a tape laying pass is commenced. The actuators 28 and 56 are actuated substantially simultaneously. With this actuation, the tape applicator head assembly 12 is poised for dispensing and compacting. The actuator 28 through its rod 32 biases the guide tube 26 and the rotation rack assembly 40 toward the mandrel 20, while the actuator 56 produces the shifted position, shown for example, in FIG. 2. In this shifted position, the regions B and C are engaged by the tape T. In addition the tape T engages a tape engaging surface portion D of the belt 78 of the dispensing and compacting block 48a. This compound movement in the tape applicator head assembly 12 produces a tension in the tape T. With this tension, the tape T is dispensed onto the mandrel 20 as the tape applicator head assembly 12 is moved with the gantry 14 in the X—X direction.

The tape T is also compacted during the tape dispensing pass because the minimum clearance between the active block (48a in FIG. 2) is less than the thickness of the tape, i.e., the distance from the point E to the mandrel surface, or the preceding tape layer, is less than the thickness of the tape. This relationship is maintained for whatever size (thickness) layup is desired by the gantry control for the Y—Y direction.

To reach the position shown in FIG. 2, the rack 52 moves to the right producing counterclockwise rotation of the gear 50 and swivel plate 46 (FIG. 6). Movement of the rack 52 in the opposition direction produces clockwise rotation of the gear 50 and the swivel plate 46 bringing the block 48b into its active position.

The shifting sequence of the dispensing and compacting blocks at each terminal end of a tape laying pass is shown in FIGS. 7b-7i. FIG. 7a shows dispensing and compacting operation in the (+X) direction (FIG. 1) with block 48a active. Beginning with FIG. 7b, one terminal end of the tape laying pass has been reached. The gantry 14 and consequently the tape applicator head assembly 12 are stopped, the actuator 28 de-activated so that the rod 32 will be retracted, the rack 52 moved to the left (FIG. 6), and the actuator 90 actuated to clamp the guide tube 26. To pivot the blocks so that block 48b becomes active requires first that the rotation rack assembly 40 move in the (—Y) direction (FIG. 1) i.e., away from the mandrel 20. Since the rotation rack assembly 40 is mounted to the guide tube 26, this end is achieved by permitting the guide tube 26 to move in the desired direction. The guide tube 26 moves in the direction (—Y) under the influence of the tension in the tape T. This movement produces the retraction of the rod 32. To insure that this retraction does not proceed too far, i.e., to such an extent the engagement of the gear 50 and the rack 52 are adversely affected, the clamp assembly 42 is provided. Activation of the clamp assembly 42 stops the sliding of the guide tube 26 in the (—Y) direction so that the pivotal shifting of the blocks occurs with the least resistance.

Relying on the tension in the tape T to assist in moving the guide tube 26 in the (—Y) direction, will relax some of the tension in the tape T. It should be noted, however, that the tension in the tape T is relaxed from the point E upward toward the spools 94 and 96. The tape downstream of the point E is not affected since it has already been compressed. In fact, because of the compressed state of the tape, the point E serves as a pivot point. Both the tension relaxation and the pivot point E are desirable toward the formation of the loop 104 shown in FIGS. 7b-7i. At the position shown in FIG. 7h, the actuator 28 is again activated and the actuator 90 de-activated to release the clamping pressure on the guide tube 26. Then at the position shown in FIG. 7i, a reverse pass is ready to begin (in the —X direction).

The transition shown in FIGS. 7b-7i produces the loop 104 which I have found produces a smooth and distortion free layup of the tape.

The invention, although embodied preferably as discussed above, can be practiced by a different construction. For example, the guide tube 26 could be eliminated and the actuator 28 connected directly to the rotation rack assembly 40. Also, the means for shifting the blocks 48a and 48b could rely on structure different than the gear 50 and rack 52. What the structure must do is produce the loops 104 at each terminal end of the tape laying pass.

What is claimed is:

1. A tape applicator head for dispensing tape in two opposing directions onto a working surface, while maintaining the orientation of the head unchanged, comprising:
   mounting means;
   a pair of dispensing blocks adjacently mounted to the mounting means, the dispensing blocks having spaced symmetrically oriented tape engaging surface portions between which the tape passes and which alternately engage the tape during movement of the head in the two opposing directions, the head imparting a tension through the dispensing blocks to the tape for drawing the tape past the dispensing blocks and onto the working surface; and
   control means connected to the dispensing blocks for shifting the dispensing blocks in unison, for alternately engaging the dispensing block tape engaging portions with the tape, and in the process, producing a localized tension relieving loop in the tape.

2. The tape applicator head is defined in claim 1, wherein the mounting means includes: a swivel plate to which the dispensing blocks are rigidly mounted, said swivel plate being connected to and pivotably shiftable by said control means.

3. The tape applicator head as defined in claim 2, wherein the control means includes: a gear mounted to the swivel plate and an actuator having a reciprocally actuated rack operatively engageable with said gear for imparting the pivotal shifting to the swivel plate.

4. The tape applicator head as defined in claim 2, wherein the mounting means further includes: a mounting cylinder; and a guide tube slidably mounted to the mounting cylinder, and wherein the control means includes: an actuator connected to the guide tube for controlling the sliding movement of the guide tube.

5. The tape applicator head as defined in claim 2, wherein the mounting means further includes: a mounting cylinder; and a guide tube slidably mounted to the mounting cylinder, and wherein the control means includes: a gear mounted to the swivel plate; an actuator having a reciprocally actuated rack operatively engageable with said gear for imparting the pivotol shifting to the swivel plate; and an actuator connected to the guide tube for controlling the sliding movement of the guide tube.

6. The tape applicator head as defined in claim 5, wherein the control means further includes: a guide tube clamp and an actuator which controls the clamping force exerted by the clamp against the guide tube.

7. In combination, a working surface on which a tape is laid, and a tape applicator head for laying the tape by dispensing the tape onto the working surface in two opposing directions while maintaining the orientation of the head unchanged and compacting the tape on the working surface, the tape applicator head comprising:
- mounting means;
- a pair of dispensing and compacting blocks adjacently mounted to the mounting means, the dispensing and compacting blocks having spaced symmetrically oriented tape engaging surface portions between which the tape passes and which alternately engage the tape during movement of the head in the two opposing directions, the minimum clearance between the tape engaging surface portion when it is in engagement with the tape, and the working surface being less than the thickness of the tape, the head imparting a tension through the dispensing and compacting blocks to the tape for drawing the tape past the dispensing and compacting blocks and onto the working surface; and
- control means connected to the dispensing and compacting blocks for shifting the dispensing and compacting blocks in unison, for alternately engaging the tape engaging portions with the tape, and in the process, producing a localized tension relieving loop in the tape.

8. The combination is defined in claim 7, wherein the mounting means includes: a swivel plate to which the dispensing blocks are rigidly mounted, said swivel plate being connected to and pivotably shiftable by said control means.

9. The combination as defined in claim 8, wherein the control means includes: a gear mounted to the swivel plate and in actuator having a reciprocally actuated rack operatively engageable with said gear for imparting the pivotal shifting to the swivel plate.

10. The combination as defined in claim 8, wherein the mounting means further includes: a mounting cylinder; and a guide tube slidably mounted to the mounting cylinder, and wherein the control means includes: an actuator connected to the guide tube for controlling the sliding movement of the guide tube.

11. The combination as defined in claim 8, wherein the mounting means further includes: a mounting cylinder; and a guide tube slidably mounted to the mounting cylinder, and wherein the control means includes: a gear mounted to the swivel plate; an actuator having a reciprocally actuated rack operatively engageable with said gear for imparting the pivotol shifting to the swivel plate; and an actuator connected to the guide tube for controlling the sliding movement of the guide tube.

12. The combination as defined in claim 11, wherein the control means further includes: a guide tube clamp and an actuator which controls the clamping force exerted by the clamp agains the guide tube.

* * * * *